(12) United States Patent
Chiang

(10) Patent No.: US 12,498,745 B2
(45) Date of Patent: Dec. 16, 2025

(54) LINEAR REGULATOR DEVICE AND CONFIGURATION METHOD THEREOF

(71) Applicant: Winbond Electronics Corp., Taichung (TW)

(72) Inventor: Ju-An Chiang, Hsinchu (TW)

(73) Assignee: Winbond Electronics Corp., Taichung (TW)

( * ) Notice: Subject to any disclaimer, the term of this patent is extended or adjusted under 35 U.S.C. 154(b) by 197 days.

(21) Appl. No.: 18/542,790

(22) Filed: Dec. 18, 2023

(65) Prior Publication Data
US 2025/0138562 A1 May 1, 2025

(30) Foreign Application Priority Data
Oct. 31, 2023 (TW) .................................. 112141853

(51) Int. Cl.
*G05F 1/575* (2006.01)
*G05F 1/46* (2006.01)

(52) U.S. Cl.
CPC .............. *G05F 1/468* (2013.01); *G05F 1/575* (2013.01)

(58) Field of Classification Search
CPC ........ H02M 1/0025; G05F 1/46; G05F 1/468; G05F 1/56; G05F 1/565
See application file for complete search history.

(56) References Cited

U.S. PATENT DOCUMENTS

| | | | |
|---|---|---|---|
| 7,148,667 B2 * | 12/2006 | Umemoto | H02M 3/156 323/282 |
| 9,146,569 B2 | 9/2015 | Li et al. | |
| 11,513,543 B2 * | 11/2022 | Gray | H03K 5/24 |
| 2019/0146532 A1 * | 5/2019 | Ballarin | G05F 1/462 323/283 |
| 2022/0300021 A1 | 9/2022 | Gwon et al. | |

FOREIGN PATENT DOCUMENTS

| | | |
|---|---|---|
| CN | 209928302 | 1/2020 |
| CN | 111786557 | 10/2020 |
| CN | 113517892 | 10/2021 |
| TW | 201351088 | 12/2013 |

OTHER PUBLICATIONS

Muffintop94, "Current-to-voltage converter opamp circuit with virtual ground", Electronics Questions & Answers, Jun. 4, 2020, pp. 1-3, available at: https://www.circuitlab.com/questions/9xnsukpy/current-to-voltage-converter-op-amp-circuit-with-virtual/.

(Continued)

*Primary Examiner* — Gary L Laxton
(74) *Attorney, Agent, or Firm* — JCIPRNET

(57) ABSTRACT

A linear regulator device and a configuration method thereof are provided. The linear regulator device includes a digital-to-analog converter (DAC), an operational amplifier (OPAMP), a switch, and a resistor. The DAC provides a controlled current according to a control signal. An inverting input node of the OPAMP is coupled to the DAC. An output node of the OPAMP is an output node of the linear regulator device. Input nodes of the switch are received multiple reference voltages respectively. The control signal is received by a control node of the switch. The output node of the switch is coupled to a non-inverting input node of the OPAMP. The resistor is coupled between the output node and the inverting input terminal of the OPAMP. A current inversion point of the linear regulator device is determined by one of the multiple reference voltages corresponding to the control signal and the controlled current.

10 Claims, 4 Drawing Sheets

(56) References Cited

OTHER PUBLICATIONS

"Office Action of Taiwan Counterpart Application", issued on Sep. 4, 2024, p. 1-p. 7.

* cited by examiner

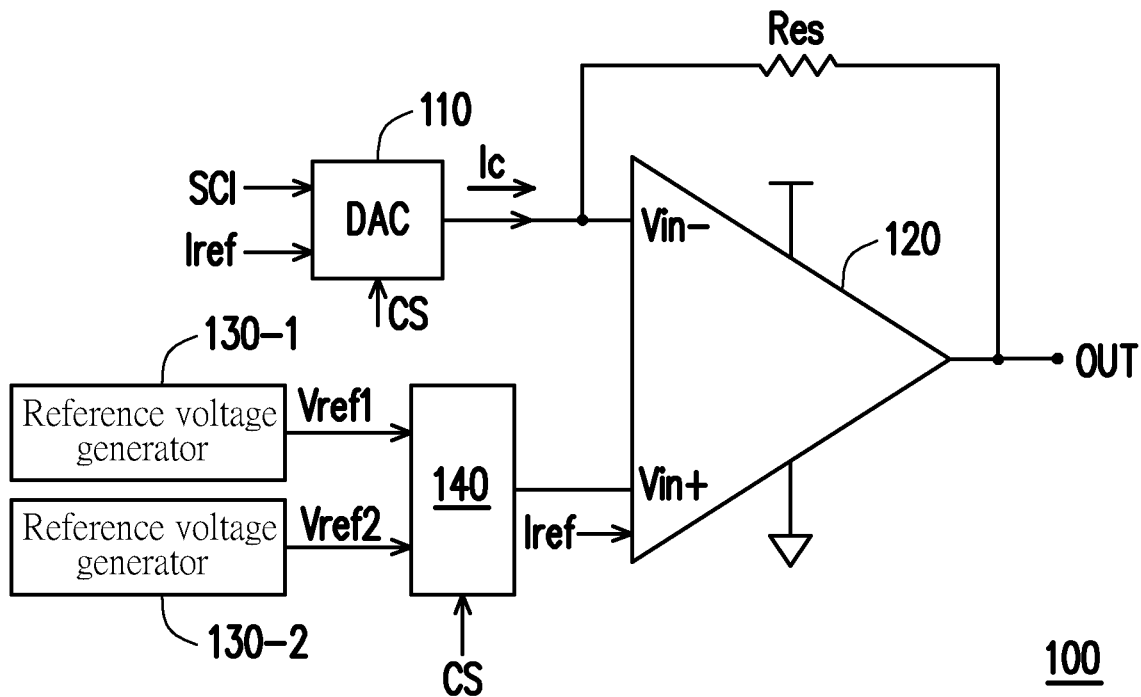

FIG. 1

Setting multiple reference voltages and multiple current values based on multiple current inversion points in a linear regulator device — S210

Providing a controlled current to the inverting input node of the operational amplifier in the linear regulator device by the digital-to-analog converter in the linear voltage regulator device according to a control signal, and selectively coupling one of the multiple reference voltages to a non-inverting input node of the operational amplifier according to the control signal — S220

FIG. 2

LINEAR REGULATOR DEVICE AND CONFIGURATION METHOD THEREOF

CROSS-REFERENCE TO RELATED APPLICATION

This application claims the priority benefit of Taiwan application serial no. 112141853, filed on Oct. 31, 2023. The entirety of each of the above-mentioned patent applications is hereby incorporated by reference herein and made a part of this specification.

BACKGROUND

Technical Field

The invention relates to the technology of a low-dropout regulator, and in particular, to a linear regulator device and configuration method thereof.

Description of Related Art

Low-dropout regulator (LDO) provides stable DC voltage and is often used in battery management, device wake-up and other technologies. The LDO is implemented in a variety of forms. Transimpedance LDO adjusts the output voltage by adjusting current. Therefore, in applications that adjust the output voltage, it needs to accurately adjust its output to achieve higher resolution. When adjusting the current of the transimpedance LDO, special attention must be paid to issues such as linearity and output offset.

SUMMARY

The present invention provides a linear regulator device and configuration method thereof, which controls the current inversion point of the linear regulator device by adjusting the fixed current value in the digital-to-analog converter (DAC) and selecting the reference voltage of the operational amplifier. In this way, the circuit area of the linear regulator device can be simplified while complying with the system application.

The linear regulator device of the present invention includes: a DAC, providing a controlled current according to a control signal; an operational amplifier (OPAMP), its inverting input node is coupled to the DAC, an output node of the OPAMP is an output node of the linear regulator device; a switch, its input nodes receives multiple reference voltages respectively, a control node of the switch receives the control signal, an output node of the switch is coupled to a non-inverting input node of the OPAMP; and a resistor, coupled between the output node and the inverting input terminal of the OPAMP, wherein a current inversion point of the linear regulator device is determined by one of the multiple reference voltages corresponding to the control signal and the controlled current.

The configuration method of the linear regulator device of the present invention includes the following steps: setting multiple reference voltages and multiple currents according to multiple current inversion points of the linear regulator device; and providing a controlled current to an inverting input node of an OPAMP in the linear regulator device by a DAC in the linear regulator device according to a control signal, wherein the controlled current corresponds to one of the currents, and one of the reference voltages is selectively coupled to a non-inverting input node of the OPAMP according to the control signal, wherein the linear regulator device further comprises a resistor coupled between an output node and the inverting input node of the OPAMP, wherein the current inversion points of the linear regulator device are determined by one of the reference voltages corresponding to the control signal and the controlled current.

Based on above, the linear regulator device and configuration method thereof described in the embodiments of the present invention are explained from the perspective of system application. It controls the current inversion point of the linear regulator device by adjusting the fixed current value in the DAC and selecting the reference voltage of the operational amplifier, so that these relationship points of the input signal and the output voltage in the linear regulator device can perform accurate linear voltage conversion. When the number of the above-mentioned relationship points is not large, the function of the linear regulator device can not only meet the system application, but also simplify the circuit area of the linear regulator device.

BRIEF DESCRIPTION OF THE DRAWINGS

FIG. 1 is a block diagram of a linear regulator device according to an embodiment of the present invention.

FIG. 2 is a flow chart of a configuration method of the linear regulator device according to an embodiment of the present invention.

DESCRIPTION OF THE EMBODIMENTS

Figure 3A:
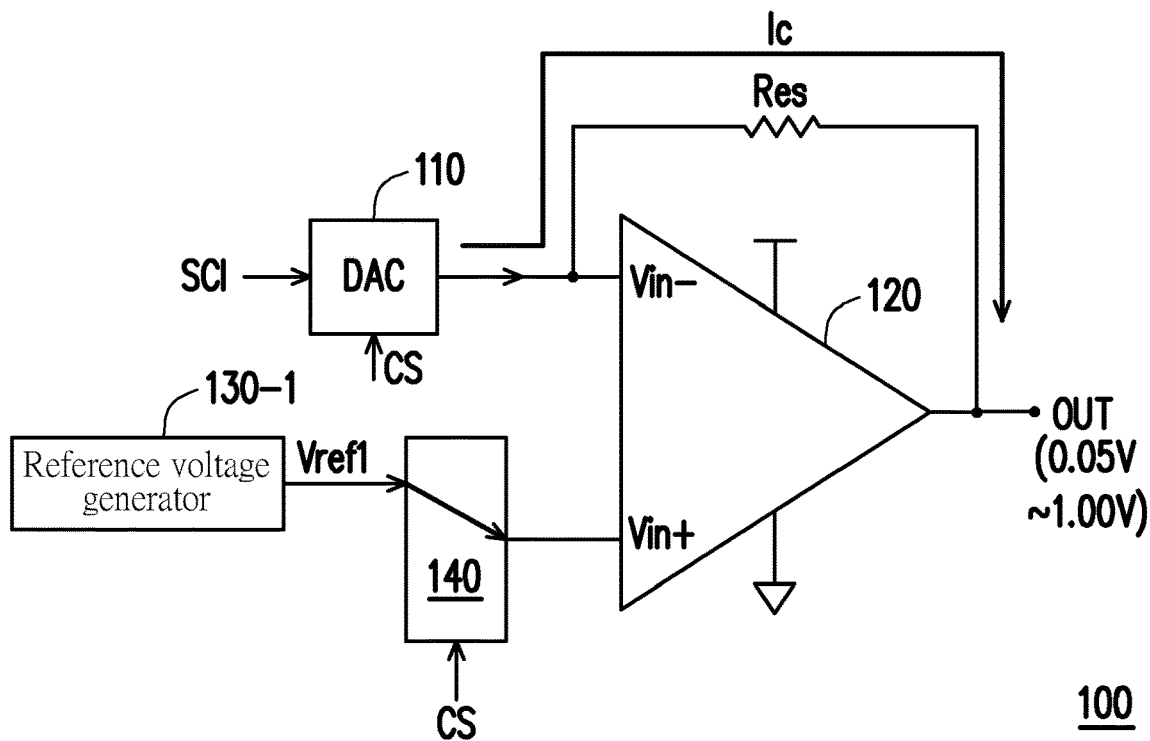
FIG. 3A and FIG. 3B are schematic diagrams of the linear regulator device when the reference voltage is 1.0V in an embodiment of the present invention.

The embodiment of the present invention designs a low-dropout regulator (LDO) from the perspective of system application. In different system applications, the LDO may not need to be very accurate in a linear relationship corresponding to all input signals and output voltages, but only needs to perform accurate linear voltage conversion at certain relationship points of the input signals and the output voltages. Therefore, the embodiments of the present invention are explained from the perspective of system application. It first determines the relationship points that the LDO needs to accurately perform linear voltage conversion, and designs the LDO based on the relationship points. When the number of the above-mentioned relationship points is not large, the function of the LDO can be adapted to the system application and the circuit area of the LDO can be simplified. In addition, the linearity and output offset of the LDO on the above-mentioned relationship points can be effectively improved.

Referring to FIG. 1, the linear regulator device 100 of the embodiment can be a circuit structure such as a low-dropout regulator (LDO), a linear voltage regulator, etc. The linear regulator device 100 includes a digital-to-analog converter (DAC) 110, an operational amplifier (OPAMP) 120, a switch 140 and a resistor Res. The linear regulator device 100 may also include a plurality of reference voltage generators, taking two reference voltage generators 130-1 and 130-2 as an example. Reference voltages Vref1, Vref2 in the embodiment are constant under different temperatures and power supply voltages. In the embodiment, a bandgap reference voltage generator is used to implement the reference voltage generators 130-1, 130-2. The switch 140 can be implemented with a multiplexer.

In general specifications, the power supply voltages commonly used in flash memory are 3.3 volts (V) and 1.8V. If the voltage changes at different temperatures are taken into account, the voltage operating range of 3.3V in the aforementioned power supply voltage is approximately between 2.5V and 3.8V; the voltage operating range of 1.8V in the aforementioned power supply voltage is approximately between 1.65V and 1.95V. The embodiment of the present invention uses the reference voltage generators to generate the reference voltages Vref1, Vref2, so that the reference voltages Vref1, Vref2 are constant within the operating range of the aforementioned power supply voltage, so as to avoid being affected by different temperatures and environments as much as possible.

The DAC 110 provides a controlled current Ic according to a control signal CS. The DAC 110 in the embodiment can be implemented by a variety of circuit structures, such as a voltage output type current source, a current output type current source, a binary weighted resistance current source (referred to as a binary current source), or a thermometer current source, etc. The embodiment of the present invention uses the circuit architecture of the binary current source to implement the DAC 110. The DAC 110 also receives a current control signal SCI, so that the DAC 110 generates a corresponding current as the controlled current Ic.

An inverting input node Vin− of the OPAMP 120 is coupled to the DAC 110. An output node OUT of the OPAMP 120 is also the output node of the linear regulator device 100. An input node of the switch 140 receives multiple reference voltages (take two reference voltages Vref1, Vref2 as an example here). A control node of the switch 140 receives the control signal CS. An output node of the switch 140 is coupled to a non-inverting input node Vin+ of the OPAMP 120. The resistor Res is coupled between the output node OUT of the OPAMP 120 and the inverting input node Vin−. When the OPAMP 120 is operating, the inverting input node Vin− and the non-inverting input node Vin+ are virtual short.

Referring to FIG. 1, from the perspective of system application, the linear regulator device 100 does not need to make the relationship between each input signals (such as the current control signal SCI) and the output voltages (such as the voltage of the output node OUT) very accurate, as long as multiple relationship points with specific applications can accurately convert the voltage. It is assumed here that the number of the aforementioned relationship points is N, and N is a positive integer greater than 1. The embodiment of the present invention proposes a configuration method of the linear regulator device 100, which can also be called the "N-point alignment method". Referring to FIG. 2, FIG. 2 can be implemented by the circuit structure of FIG. 1, and the number of the relationship points in FIG. 1 is 2 (i.e., N is equal to 2). A reference current Iref in FIG. 1 is used to drive the DAC 110 and the OPAMP 120 to operate normally. The value of the reference current Iref in the embodiment may be 4 μA.

Referring to FIG. 1 and FIG. 2, in step S210, since the number of relationship points is N, the embodiment of the present invention uses N relationship points as corresponding N current inversion points in the linear regulator device 100. Furthermore, multiple reference voltages (such as N reference voltages) and multiple current values (such as N current values) are set according to the current inversion points (such as N current inversion points) in the linear regulator device 100. Each relationship point is a corresponding current inversion point in the linear regulator device 100, and each relationship point corresponds to one reference voltage and one current value. In the embodiment, the N relationship points required for accurate linear voltage conversion are equal to the values of the corresponding reference voltage.

"N current values" are calculated through the voltage values of the aforementioned N reference voltages, the circuit structure of the OPAMP 120 and the resistor Res. The purpose of the aforementioned design "N current values" is hoped that a voltage output range corresponding to the output voltage in the output node OUT of the linear regulator device 100 and multiple steps in the output voltage will not be affected by the aforementioned reference voltage but by a selection of the control signal CS, this part will be described later. The embodiment of the present invention also provides a circuit structure of the DAC 110 so that the current value provided by the DAC 110 is adjusted according to the aforementioned "N current values".

When the linear regulator device 100 outputs one of the aforementioned N relationship points, the current source (provided by the DAC 110) corresponding to one current value corresponding to each of the aforementioned relationship points can be provided to the OPAMP 120 by the control signal CS. On the other hand, when the linear regulator device 100 outputs one of the aforementioned N relationship points, one reference voltage (such as one of the reference voltages Vref1, Vref2) corresponding to the aforementioned N relationship points can be provided to the OPAMP 120 through the switch 140 by the control signal CS. Thereby, the entire system of the linear regulator device 100 can accurately perform linear voltage conversion at one of the selected N relationship points, and so on. That is to say, in step S220, the linear regulator device 100 can make the DAC 110 in the linear regulator device 100 provide the controlled current Ic to the inverting input node Vin− of the OPAMP 120 in the linear regulator device 100 according to the control signal CS. Where the controlled current Ic corresponds to one of the aforementioned current values. Furthermore, the linear regulator device 100 selectively couples one of the aforementioned current values to the non-inverting input node Vin+ of the OPAMP 120 according to the control signal CS.

Therefore, when the linear regulator device 100 in FIG. 1 is adjusted by the control signal CS to cause the reference voltage to change, as long as the corresponding current value of the DAC 110 is properly designed, the voltage output range corresponding to the output voltage in the output node OUT and the multiple steps in the output voltage can be approximated to the situation before changing the reference voltage. Therefore, the linear regulator device 100 in FIG. 1 can vary the voltage output range and the step of the output voltage in the output voltage without being affected by the selection of multiple reference voltages.

For example, if the linear regulator device 100 is applied to a non-volatile memory (NVM), two voltage values (such as a reading voltage and a verifying voltage) in the NVM are the relationship points that require accurate voltage conversion, that is, the aforementioned N is equal to 2. The embodiment assumes that the reading voltage of NVM is 1.0V and the verifying voltage is 2.0V. Therefore, the embodiment of the present invention selectively sets two reference voltages and two current values according to two current inversion points in the linear regulator device 100.

Referring to FIG. 3A, FIG. 3A shows a first current inversion point (the first relationship point between the input signal and the output voltage) of 1.0V. And when the output voltage of the output node OUT corresponds to a voltage output range between 0.05V and 1.00V (that is, when the output voltage of the output node OUT is less than the selected reference voltage 1.0V), the controlled current Ic may flow from the DAC 110 to the output node OUT.

In details, assuming that the resistance value of the resistor Res is 396.4kΩ and the minimum step current of the linear regulator device 100 is 0.125 µA, the voltage difference of each step is approximately 50 mV (approximately 396.4k (2 times 0.125 µA). And the switch 140 is controlled by the control signal CS to couple the reference voltage Vref1 (its voltage value is 1.0V) to the non-inverting input node Vin+ of the OPAMP 120. In this way, a starting value Vstrt1 of the voltage output range in the output voltage can be calculated from the above information, as shown in the following equation (1). It is obvious from equation (1) that the starting value Vstrt1 is approximately 0.05V. "2.5µ–0.125µ" in equation (1) is the controlled current Ic provided by the DAC 110.

$$Vstrt1 = 1.0 - (396.4k \times (2.5\mu - 0.125\mu)) = 0.05855 \text{ V} \qquad (1)$$

Figure 3B:
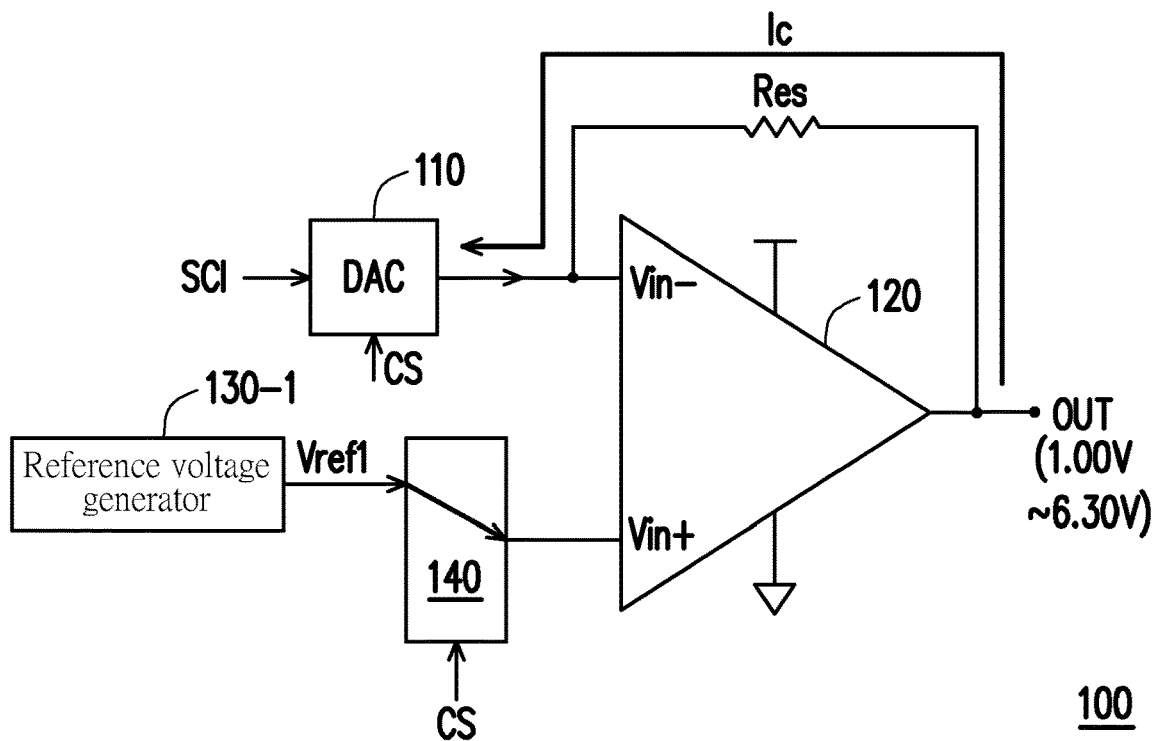

Referring to FIG. 3B, FIG. 3B shows a first current inversion point (the first relationship point between the input signal and the output voltage) of 1.0V. And when the output voltage of the output node OUT corresponds to a voltage output range between 1.00V and 6.30V (that is, when the output voltage of the output node OUT is greater than the selected reference voltage 1.0V), the controlled current Ic may flow from the output node OUT to the DAC 110. In details, as assumed above, an ending value Vend1 of the voltage output range in the output voltage can be calculated from the above information, as shown in the following equation (2). It is obvious from equation (2) that the end value Vend1 is approximately 6.30V. "15.875µ–2.5µ" in equation (2) is the controlled current Ic provided by the DAC 110.

$$Vend1 = 1.0 + (396.4k \times (15.875\mu - 2.5\mu)) = 6.30185 \text{ V} \qquad (2)$$

It can be seen from FIG. 3A and FIG. 3B that when the output voltage of the output node OUT is close to the reference voltage Vref1 (1.0V), its voltage conversion will tend to be accurate. The direction of the controlled current at this time will also be reversed. The starting value Vstrt1 and the ending value Vend1 of the voltage output range in the output voltage are 0.05V and 6.30V.

Figure 4A:
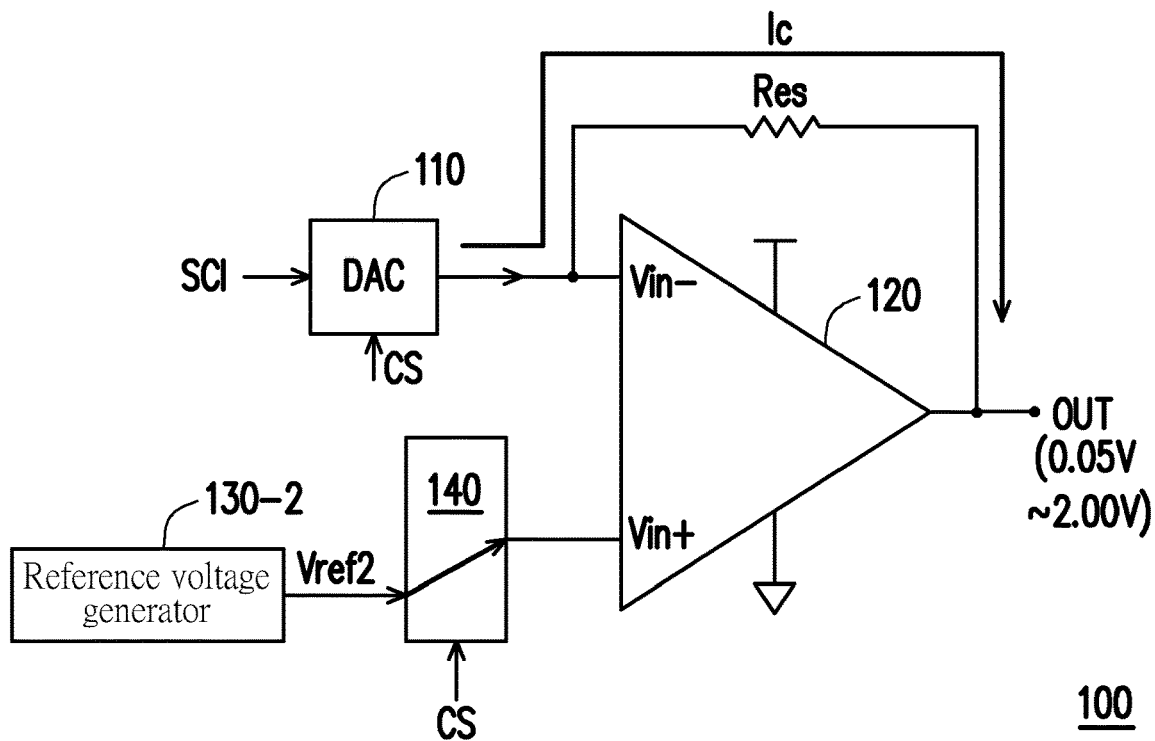
FIG. 4A and FIG. 4B are schematic diagrams of the linear regulator device when the reference voltage is 2.0V in an embodiment of the present invention.

Referring to FIG. 4A, FIG. 4A shows a second current inversion point (the second relationship point between the input signal and the output voltage) of 2.0V. And when the output voltage of the output node OUT corresponds to a voltage output range between 0.05V and 2.00V (that is, when the output voltage of the output node OUT is less than the selected reference voltage 2.0V), the controlled current Ic may flow from the DAC 110 to the output node OUT.

In details, as assumed above, the voltage difference of each step is approximately 50 mV (approximately 396.4k (2 times 0.125 µA), and a starting value Vstrt2 of the voltage output range in the output voltage can be calculated from the above information, as shown in the following equation (3). It is obvious from equation (3) that the starting value Vstrt2 is approximately 0.05V. "5.0µ–0.125µ" in equation (3) is the controlled current Ic provided by the DAC 110.

$$Vstrt2 = 2.0 - (396.4k \times (5.0\mu - 0.125\mu)) = 0.06755 \text{ V} \qquad (3)$$

Figure 4B:
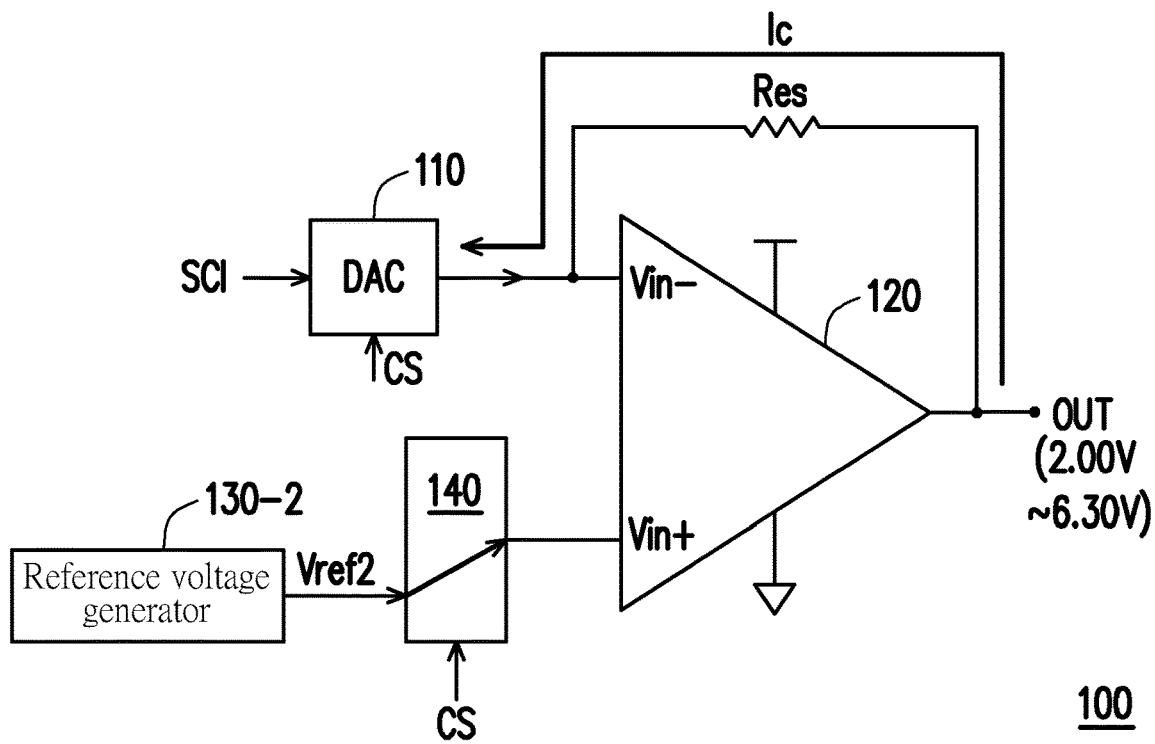

Referring to FIG. 4B, FIG. 4B shows a second current inversion point (the second relationship point between the input signal and the output voltage) of 2.0V. And when the output voltage of the output node OUT corresponds to a voltage output range between 2.00V and 6.30V (that is, when the output voltage of the output node OUT is greater than the selected reference voltage 2.0V), the controlled current Ic may flow from the output node OUT to the DAC 110. In details, as assumed above, an ending value Vend2 of the voltage output range in the output voltage can be calculated from the above information, as shown in the following equation (4). It is obvious from equation (4) that the end value Vend2 is approximately 6.30V. "15.875µ–5.0µ" in equation (4) is the controlled current Ic provided by the DAC 110.

$$Vend2 = 2.0 + (396.4k \times (15.875\mu - 5.0\mu)) = 6.30185 \text{ V} \qquad (4)$$

It can be seen from FIG. 4A and FIG. 4B that when the output voltage of the output node OUT is close to the reference voltage Vref2 (2.0V), its voltage conversion will tend to be accurate. The direction of the controlled current at this time will also be reversed. The starting value Vstrt2 and the ending value Vend2 of the voltage output range in the output voltage are 0.05V and 6.30V respectively, which are similar to the starting value Vstrt1 and the ending value Vend1 of the voltage output range corresponding to the aforementioned FIG. 3A and FIG. 3B. Therefore, even if the reference voltage is changed or switched to Vref1 or Vref2 by the linear regulator device 100 in FIG. 1, the voltage output range (0.05V to 6.30V) corresponding to the output voltage in the output node OUT and the multiple steps (the voltage difference for each step is approximately 50 mV) in the output voltage will not change accordingly.

Figure 5:
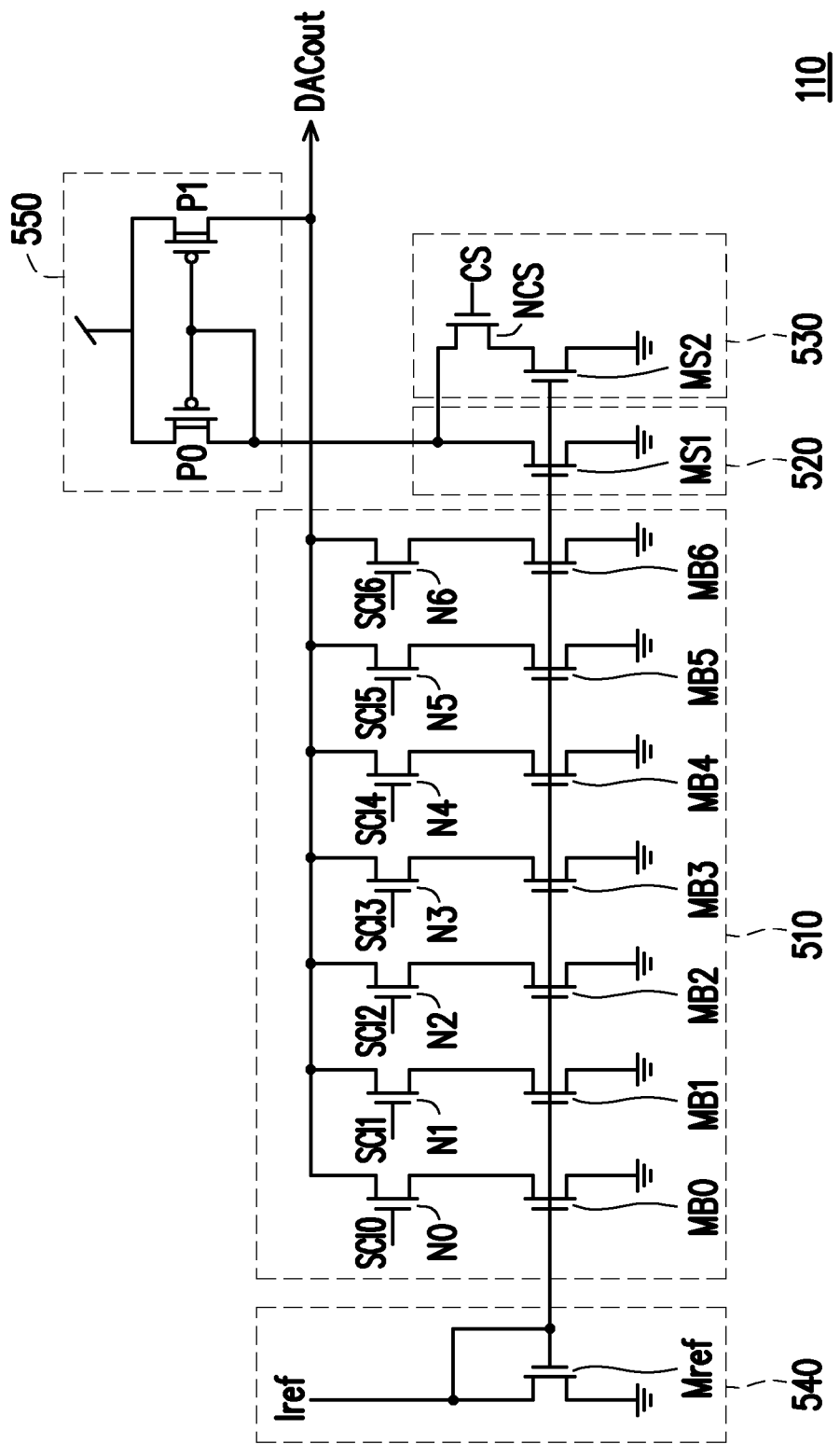
FIG. 5 is a circuit diagram of a digital-to-analog converter in an embodiment of the present invention.

FIG. 5 is a circuit diagram of the DAC 110 in an embodiment of the present invention. The embodiment of the present invention provides a circuit structure of the DAC 110 so that the current value provided by the DAC 110 is adjusted according to the aforementioned "N current values". The DAC 110 of FIG. 5 includes a plurality of controlled current sources 510, a first fixed current source 520 and a second fixed current source 530. The DAC 110 of FIG. 5 further includes a reference current source 540 and a current mirror circuit 550.

The controlled current sources 510 includes a plurality of transistors N0 to N6 used as switches and transistors MB0 to MB6 used as current sources. The control nodes of the transistors N0 to N6 respectively receive the signals SCI0 to SCI6 in the current control signal SCI to selectively guide the current generated by the corresponding transistors MB0 to MB6 to the output node DACout of the DAC 110.

The first fixed current source 520 includes a transistor MS1, and the current mirror circuit 550 includes transistors P0 and P1. The first fixed current source 520 and the current mirror circuit 550 are used to provide a first fixed current to the output node DACout of the DAC 110. The second fixed current source 530 includes a transistor MS2 and a switch NCS. A control node of the switch NCS receives the control signal CS. Therefore, the second fixed current source 530 is controlled by the control signal CS to selectively generate a second fixed current. The current mirror circuit 550 serves as a sink and a source of the control current.

The reference current source 540 receives the reference current Iref to drive the entire DAC 110. The reference current source 540 includes a transistor Mref. The reference current source 540, the controlled current sources 510, the first fixed current source 520 and the second fixed current source 530 form a current mirror circuit. The size of the transistor Mref and the transistors MB0 to MB6, MS1, MS2 are in a specific proportion to each other so that the transistors MB0 to MB6, MS1, MS2 can provide different current values. For example, the size ratio of the transistor Mref to the transistors MB0 to MB6, MS1, MS2 in the embodiment is as shown in the following equation (5).

$$Mref:MB0:MB1:MB2:MB3:MB4:MB5:MB6:MS1:MS2 = \\ 1:\frac{1}{32}:\frac{1}{16}:\frac{1}{8}:\frac{1}{4}:\frac{1}{2}:1:2:\frac{5}{8}:\frac{5}{8} \qquad (5)$$

Therefore, when the current value of the reference current Iref is 4 µA, the current values provided by the transistors MB0 to MB6, MS1, and MS2 are 0.125 µA, 0.25 µA, 0.5 µA, 1.0 µA, 2.0 µA, 4.0 µA, respectively.

Therefore, when the control signal CS is disabled, it means that the linear regulator device 100 in FIG. 1 uses the reference voltage Vref1 (1.0V) as the current inversion point. At this time, the second fixed current source 530 does not provide the second fixed current. The controlled current Ic provided by the output node DACout of the DAC 110 is determined by the sub-currents provided by the controlled current sources 510 and the first fixed current provided by the first fixed current source 520. That is, the controlled current Ic at this time is the sum of the sub-currents and the first fixed current. In other words, when the control signal CS is disabled, the second fixed current provided by the second fixed current source 530 is not needed.

When the control signal CS is enabled, it means that the linear regulator device 100 in FIG. 1 uses the reference voltage Vref2 (2.0V) as the current inversion point. At this time, the second fixed current source 530 may provide the second fixed current. The controlled current Ic provided by the output node DACout of the DAC 110 is determined by the sub-currents provided by the controlled current sources 510, the first fixed current provided by the first fixed current source 520 and the second fixed current provided by the second fixed current source 530. That is, the controlled current Ic at this time is the sum of the sub-currents, the first fixed current and the second fixed current. In other words, when the control signal CS is enabled, the fixed current of the DAC 110 increases from the original 2.5 µA (the first fixed current) to 5.0 µA (the sum of the first fixed current and the first fixed current).

Since the DAC 110 in FIG. 5 is applied to the embodiment of FIG. 1 and N is equal to 2, the number of the second fixed current source is 1. If the number of the reference voltages in the embodiment is N, the second fixed current source will be additionally set in the DAC 110, and the number of the second fixed current source is (N−1).

In summary, the linear regulator device and configuration method thereof described in the embodiments of the present invention are explained from the perspective of system application. It controls the current inversion point of the linear regulator device by adjusting the fixed current value in the DAC and the reference voltage of the operational amplifier, so that these relationship points of the input signal and the output voltage in the linear regulator device can perform accurate linear voltage conversion. When the number of the above-mentioned relationship points is not large, the function of the linear regulator device can not only meet the system application, but also simplify the circuit area of the linear regulator device.

What is claimed is:

1. A linear regulator device, comprising:
a digital-to-analog converter (DAC), provides a controlled current according to a control signal;
an operational amplifier (OPAMP), an inverting input node of the OPAMP is coupled to the DAC, an output node of the OPAMP is an output node of the linear regulator device;
a switch, an input node of the switch receives multiple reference voltages, a control node of the switch receives the control signal, an output node of the switch is coupled to a non-inverting input node of the OPAMP; and
a resistor, coupled between the output node of the OPAMP and the inverting input terminal of the OPAMP,
wherein a current inversion point of the linear regulator device is determined by one of the multiple reference voltages corresponding to the control signal and the controlled current.

2. The linear regulator device according to claim 1, wherein the DAC comprises:
a plurality of controlled current sources, controlled by a second control signal to generate multiple sub-currents;
a first fixed current source, generates a first fixed current; and
at least one second fixed current source, controlled by the control signal to selectively generate a second fixed current,
wherein when the control signal is disabled, the controlled current is determined by the sub-currents and the first fixed current,
when the control signal is enabled, the controlled current is determined by the sub-currents, the first fixed current and the second fixed current.

3. The linear regulator device according to claim 2, wherein the DAC further comprises:
a reference current source,
wherein the reference current source, the plurality of controlled current sources, the first fixed current source and the at least one second fixed current source form a current mirror circuit.

4. The linear regulator device according to claim 2, wherein the number of the reference voltages is N, the number of the at least one second fixed current source is (N−1), and the N is a positive integer greater than 1.

5. The linear regulator device according to claim 1, wherein when the OPAMP is operating, the inverting input node and the non-inverting input node of the OPAMP are virtual short.

6. The linear regulator device according to claim 1, wherein the current inversion point of the linear regulator device is a selected reference voltage selected from the reference voltages by the control signal,
wherein when an output voltage of the output node is greater than the selected reference voltage, the controlled current flows from the output node to the inverting input node of the OPAMP, when the output voltage of the output node is less than the selected reference voltage, the controlled current flows from the non-inverting input node of the OPAMP to the output node.

7. The linear regulator device according to claim 1, wherein a voltage output range corresponding to an output voltage of the output node and multiple steps in the output voltage vary not by the reference voltages but by a selection of the control signal.

8. A configuration method of a linear regulator device, comprising:

setting multiple reference voltages and multiple currents according to multiple current inversion points of the linear regulator device; and providing a controlled current to an inverting input node of an operational amplifier (OPAMP) in the linear regulator device by a digital-to-analog converter (DAC) in the linear regulator device according to a control signal, wherein the controlled current corresponds to one of the currents, and one of the reference voltages is selectively coupled to a non-inverting input node of the OPAMP according to the control signal, wherein the linear regulator device further comprises a resistor coupled between an output node of the OPAMP and the inverting input node, wherein the current inversion points of the linear regulator device are determined by one of the reference voltages corresponding to the control signal and the controlled current.

9. The configuration method according to claim 8, wherein the DAC comprises:

a plurality of controlled current sources, controlled by a second control signal to generate multiple sub-currents;

a first fixed current source, generates a first fixed current; and at least one second fixed current source, controlled by the control signal to selectively generate a second fixed current, wherein when the control signal is disabled, the controlled current is determined by the sub-currents and the first fixed current, when the control signal is enabled, the controlled current is determined by the sub-currents, the first fixed current and the second fixed current.

10. The configuration method according to claim 8, wherein the current inversion point of the linear regulator device is a selected reference voltage selected from the reference voltages by the control signal, wherein when an output voltage of the output node is greater than the selected reference voltage, the controlled current flows from the output node to the DAC, when the output voltage of the output node is less than the selected reference voltage, the controlled current flows from the DAC to the output node.

\* \* \* \* \*